United States Patent [19]

Dumbaugh, Jr. et al.

[11] 4,456,692
[45] Jun. 26, 1984

[54] BI₂O₃—GA₂O₃ GLASSES

[75] Inventors: William H. Dumbaugh, Jr., Painted Post; Brian P. Tyndell, Beaver Dams, both of N.Y.

[73] Assignee: Corning Glass Works, Corning, N.Y.

[21] Appl. No.: 535,895

[22] Filed: Sep. 26, 1983

[51] Int. Cl.³ .......................... C03C 3/12; C03C 3/30
[52] U.S. Cl. ..................................... 501/41; 501/42; 501/43; 501/904
[58] Field of Search ..................... 501/41, 42, 43, 904

[56] References Cited
U.S. PATENT DOCUMENTS

| | | | |
|---|---|---|---|
| 3,188,216 | 6/1965 | Burton et al. | 501/41 |
| 3,511,992 | 5/1970 | Patterson | 501/40 |
| 3,723,141 | 3/1973 | Dumbaugh, Jr. | 501/41 |
| 3,837,868 | 9/1974 | Berlene et al. | 501/42 |
| 4,081,857 | 3/1978 | Hanold | 501/41 |
| 4,197,136 | 4/1980 | Inoue et al. | 501/42 |
| 4,220,547 | 9/1980 | Abe et al. | 501/41 |
| 4,341,542 | 7/1982 | Nakamura et al. | 501/45 |

OTHER PUBLICATIONS

Rawson H; "Inorganic Glass Forming Systems", Academic Press, London & New York, 1967, pp. 200-201.
Kantor, P. et al.; "Preparation of Iron Sesquioxide Glasses of Ultra-Fast Quenching from the Melt (splat cooling)", *Journal of Materials Science*, 8, 1973, pp. 1359-1361.

Primary Examiner—Mark Bell
Attorney, Agent, or Firm—C. S. Janes, Jr.

[57] ABSTRACT

This invention is concerned with the production of glasses in the $Bi_2O_3$—$Ga_2O_3$ system with, preferably, CdO which exhibit high indices of refraction and infrared transmitting capabilities to wavelengths of about 8 microns. The broadest scope of operable glasses involves, in weight percent, about

| | |
|---|---|
| $Bi_2O_3$ | 40–90 |
| $Ga_2O_3$ | 5–30 |
| CdO | 0–35 | with the preferred glasses consisting essentially of about

| | |
|---|---|
| $Bi_2O_3$ | 55–85 |
| $Ga_2O_3$ | 7–17 |
| CdO | 4–28 |

4 Claims, 3 Drawing Figures

$Bi_2O_3$—$Ga_2O_3$ GLASSES

BACKGROUND OF THE INVENTION

One currently very active area of glass research has centered around the production of optical waveguides. This research has involved the development of new glass compositions and production techniques to improve the transmission (reduce the attenuation) thereof. One branch of the composition research has concentrated upon glasses demonstrating high transmission in the infrared region of the radiation spectrum. Hence, because attenuation decreases approximately with the fourth power of wavelength, the greater the infrared transmission the lower the loss.

Considerable effort has been expended in developing oxide-free glasses, e.g., fluoride and chalcogenide compositions, which do indeed transmit infrared radiation at long wavelengths. However, those glasses are frequently quite susceptible to surface deterioration in service, are relativley unstable to devitrification, and exhibit high coefficients of thermal expansion. Furthermore, added care must be employed in melting and forming those compositions. Consequently, research has continued to discover glass compositions capable of being melted and formed utilizing apparatus and techniques conventional in the commercial manufacture of glass products.

U.S. Pat. No. 3,723,141 briefly reviews oxide-containing glass compositions disclosed in the prior art stated to display good transmission of infrared radiation. It was there observed that those glasses of the prior art manifested good transmission only to wavelengths to about six microns. The patent, itself, described glass compositions which transmitted significant amounts of infrared radiation at wavelengths longer than six microns. The patented glasses had compositions within the $PbO$—$Bi_2O_3$ system and consisted essentially, in weight percent on the oxide basis, of

| PbO | 10–75 | BaO | 2–25 |
|---|---|---|---|
| $Bi_2O_3$ | 10–85 | ZnO | 1–10 |
| $PbO + Bi_2O_3$ | At Least 60 | $SiO_2 + B_2O_3 + P_2O_5$ | <1 |

Optionally, up to 10% individually and up to 20% total of the following oxides may also be included: $As_2O_3$, CaO, CdO, $GeO_2$, HgO, $Sb_2O_3$, SrO, $TiO_2$, $Tl_2O_3$, alkali metal oxides, and the colorant or transition metal oxides.

U.S. Pat. No. 3,837,868 is designated to comprise an improvement upon the glasses disclosed in U.S. Pat. No. 3,723,141. Thus, the latter glasses contained $Fe_2O_3$ to enhance the stability thereof against devitrification, resulting in compositions consisting essentially, expressed in terms of cation percent on the oxide basis, of

| $Bi_2O_3$ | 8–80 | $PbO + CdO$ | At Least 5% |
|---|---|---|---|
| PbO | 0–57 | $Fe_2O_3$ | 5–32.5 |
| CdO | 0–32 | | |

Optionally, up to 15% collectively of compatible glassmaking constituents may also be included in the indicated individual amounts: up to 7.5% BaO and/or ZnO, up to 5% $GeO_2$, $V_2O_5$, NiO, CsO, and other transition metal oxides, and up to 2% $B_2O_3$ and/or $SiO_2$.

Rather than repeating the discussion of the prior art provided in that patent and the review supplied in U.S. Pat. No. 3,723,141, the full disclosures of those patents are specifically incorporated herein by reference.

U.S. application Ser. No. 476,929, filed by us Mar. 21, 1983, under the title LEAD GALLATE GLASSES, discloses glass compositions in the base $PbO$-$Ga_2O_3$ system, to which $Bi_2O_3$ is preferably included, capable of transmitting significant infrared radiation to a wavelength of eight microns. The binary glasses consist essentially, in weight percent on the oxide basis, of about 72-85% PbO and 15-28% $Ga_2O_3$. The addition of $Bi_2O_3$ to the base compositions very substantially improves the melting and forming characteristics thereof, as well as enhancing the stability of the glasses against devitrification. Accordingly, the incorporation of $Bi_2O_3$ significantly expands the operable glass compositions to about 10-85% PbO, 5-30% $Ga_2O_3$, and up to 80% $Bi_2O_3$.

Optionally, up to 30% total of the following compatible metal oxides in the indicated individual proportions may be included:

| | | | | | | | |
|---|---|---|---|---|---|---|---|
| $Cs_2O$ | 0–20 | CuO | 0–2 | ZnO | 0–5 | | |
| HgO | 0–30 | CdO | 0–12 | $K_2O$ | 0–2 | | |
| $Tl_2O_3$ | 0–20 | $GeO_2$ | 0–5 | $In_2O_3$ | 0–10 | | |
| $Sb_2O_3$ | 0–10 | $Na_2O$ | 0–2 | $SiO_2$ | 0–2 | | |
| $TeO_2$ | 0–10 | $Rb_2O$ | 0–5 | $ZrO_2$ | 0–5 | | |
| $Cr_2O_3$ | 0–5 | $HfO_2$ | 0–5 | $Nb_2O_5$ | 0–5 | | |
| $MnO_2$ | 0–5 | $Al_2O_3$ | 0–3 | $Ta_2O_5$ | 0–5 | | |

It was also observed that the presence of a halogen, preferably chlorine, in an amount of up to about 5% was useful in removing water from the glass, thereby eliminating the strong absorption at a wavelength of about three microns which is characteristic of water in glass.

Summary of the Invention

We have now discovered a range of PbO-free glass compositions in the base $Bi_2O_3$-$Ga_2O_3$ system, to which CdO is preferably included, that exhibit substantial transmission of infrared radiation to a wavelength of eight microns and can manifest refractive indices in excess of 2.4. The presence of CdO significantly improves the stability of the glasses against devitrification and the melting and forming properties thereof. The chemical durability of the glasses is excellent when compared with others demonstrating such high indices of refraction and transmissions of infrared radiation to long wavelengths. For example, no evidence of weathering is discerned after several months' exposure to ambient atmospheres and the glasses do not dissolve after submersion into a water bath at ambient temperature for extended periods of time.

Where the molten glass is very quickly cooled (quenched) to form glass bodies of small dimensions, e.g., frits formed through drigaging, good glass quality can be achieved in compositions consisting essentially, expressed in terms of weight percent on the oxide basis, of about

| $Bi_2O_3$ | 40–90 |
|---|---|
| $Ga_2O_3$ | 5–30 |
| CdO | 0–35 |

However, where conventional glass melting and forming techniques are to be used in producing glass articles of some bulk, CdO will be included to ehance the stability of the glass. Accordingly, the preferred ranges of components will consist essentially of about

| | |
|---|---|
| $Bi_2O_3$ | 55-85 |
| $Ga_2O_3$ | 7-17 |
| CdO | 4-28 |

The following compatible metal oxides in the indicated individual proportions up to a total of 30% may also be advantageously included to modify the chemical and physical characteristics of the glass without substantially adversely affecting the infrared radiation transmission properties thereof.

| | | | |
|---|---|---|---|
| $Cs_2O$ | 0-10 | $GeO_2$ | 0-3 |
| HgO | 0-25 | $Sb_2O_3$ | 0-4 |

Minor amounts of PbO may also be included in the glass composition, but its presence tends to add color to the glass. Finally, in like manner to Ser. No. 476,929 supra, the inclusion of a halogen (preferably chlorine) in an amount up to about 3% by weight is beneficial in removing water from the glass, thereby eliminating the water absorption peak at a wavelength of about three microns.

Prior Literature

Inorganic Glass-Forming Systems, H. Rawson, Academic Press, London and New York, 1967, pages 200-1, provides a review of research of glass compositions in the $CaO-Ga_2O_3$ system. Greater glass stability was attained via the inclusion of a few percent of $SiO_2$.

P. Kantor, A. Revcolevschi, and R. Collongues in "Preparation of Iron Sesquioxide Glasses of Ultra-Fast Quenching from the Melt ("splat cooling")", *Journal of Materials Science*, 8, pages 1359-61 (1973) describe the preparation of glass bodies of very small size dimensions through splat cooling, i.e., essentially instantaneous cooling, of molten glass. The authors noted their products consisted of flakes and/or thin films. The publication was concerned primarily with compositions in the $Fe_2O_3$—BaO, FeO—CaO, and $Fe_2O_3$—PbO systems, but glasses containing about 40-95 mole percent PbO and 5-60 mole percent $Ga_2O_3$ (44.3-95.8 weight percent PbO and 4.2-55.7 weight percent $Ga_2O_3$) were mentioned. Nowhere is any reference made to $Bi_2O_3$.

U.S. Pat. No. 3,188,216 discloses the production of glasses having base compositions within the $SrO-Ga_2O_3$ field which are asserted to be capable of transmitting at least 15% of infrared radiation at a wavelength of 6.5 microns. The glasses consist essentially of at least 50% by weight of SrO and $Ga_2O_3$, those two components being present in the ratio of 0.66-1.13 parts of $Ga_2O_3$ to one part of SrO. The glasses may optionally contain up to 45% PbO, up to 35% of at least one oxide selected from the group of $Li_2O$, $Na_2O$, $K_2O$, CaO, and MgO, and up to 40% of at least one oxide selected from the group of CdO, CuO, ZnO, $La_2O_3$, $TiO_2$, $ZrO_2$, $ThO_2$, $GeO_2$, $Ta_2O_5$, $As_2O_3$, and $Sb_2O_3$. No mention is made of $Bi_2O_3$.

U.S. Pat. No. 3,511,992 is directed to glass compositions asserted to exhibit good transmission to a wavelength of 20 microns consisting essentially of 35 atomic percent germanium, 60 atomic percent selenium, and 5 atomic percent gallium. $Bi_2O_3$ is nowhere found in the specification.

U.S. Pat. No. 4,197,136 is drawn to glasses designed for optical transmission lines consisting essentially, in weight percent, of 10-58% $P_2O_5$, 15-85% $GeO_2$, and 5-40% $Ga_2O_3$. There is no indication of the infrared transmission properties of the glasses nor is there any discussion of $Bi_2O_3$-containing glasses.

U.S. Pat. No. 4,341,542 is also directed to the preparation of glasses designed for optical transmission lines. The compositions therefor consist essentially, in weight percent, of 45-55% $P_2O_5$, 20-35% $Ga_2O_3$, 10-25% $GeO_2$, and 0-10% $SiO_2$. $Bi_2O_3$ is nowhere mentioned.

DESCRIPTION OF PREFERRED EMBODIMENTS

Figure 1:
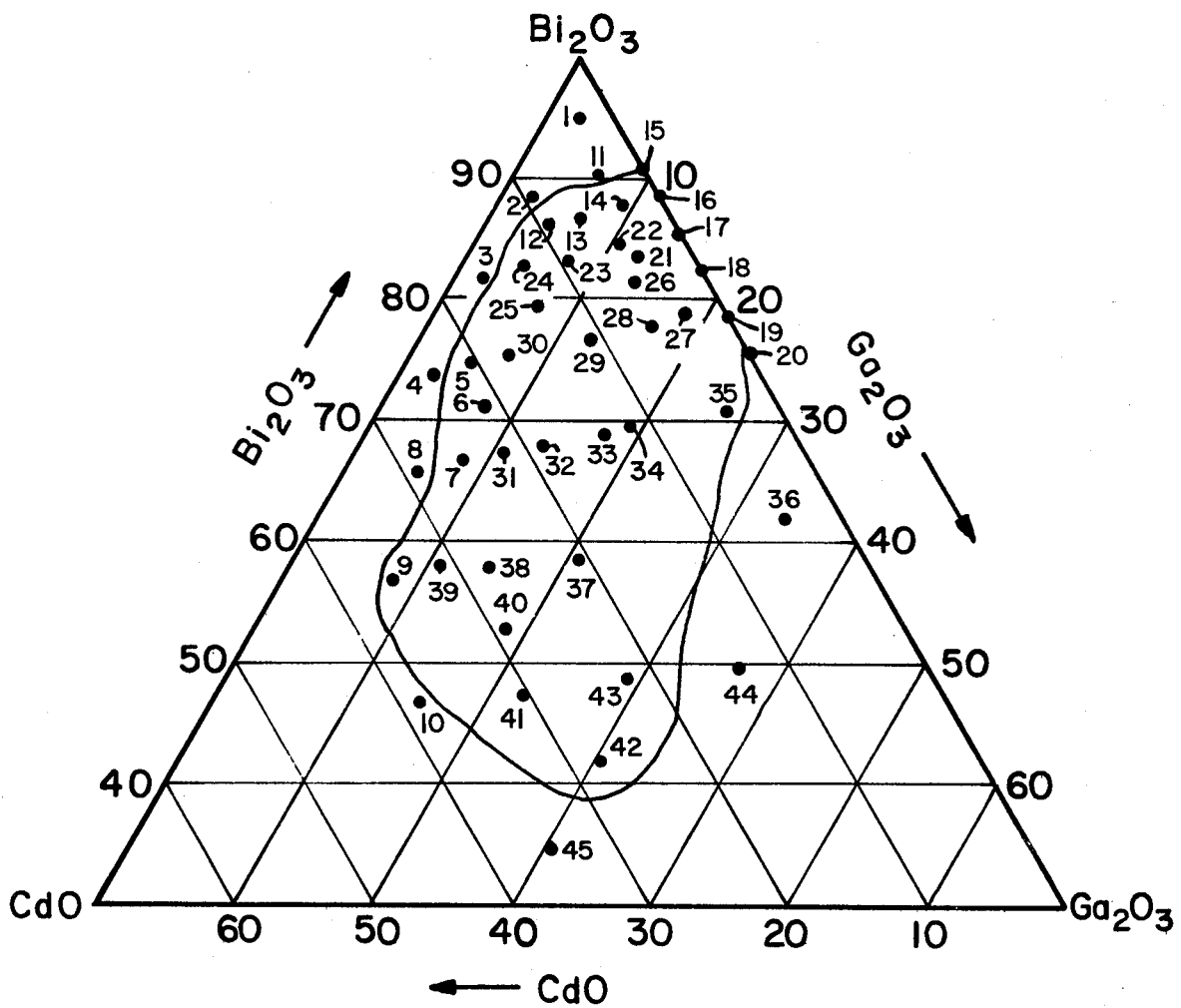
FIG. 1 is a ternary composition diagram of the $Bi_2O_3$—$Ga_2O_3$—CdO system illustrating the area of compositions forming good quality glass in quenched bodies of small dimensions.

Table I reports a number of glass compositions, expressed in terms of approximate weight percent on the oxide basis, illustrating the parameters of the invention. The actual batch ingredients consisted of $Bi_2O_3$, $Ga_2O_3$, and CdO. Nevertheless, it will be understood that other starting materials capable, when melted together, of being converted into the desired oxide in the proper proportion may be employed.

The batch materials were compounded in the proper proportions and then divided into two fractions. The first fraction was tumble mixed and about one gram thereof placed in a depression formed in a platinum strip. The platinum strip was resistance-heated by passing an electric current therethrough. After the batch had melted to a uniform consistency, the electric current to the platinum strip was cut off, the melt very quickly solidifying to room temperature. A 50-gram portion of the second batch fraction was first ballmilled in a polypropylene jar using alumina balls and then charged into a platinum crucible. The crucible was introduced into a resistance-heated furnace operating at 1000° C., the batch melted for 20 minutes, the melt poured into a graphite mold preheated to 360° C., and allowed to cool therein to room temperature. Each exemplary composition is positioned in FIGS. 1 and 2.

A visual description of glass quality for the 1 gram body (1 g) and the 50 gram body (50 g) is recorded in Table I wherein "good" indicates essentially no devitrification or unmelted batch, "fair" signifies the inclusion of a minor amounts of devitrification or unmelted batch, and "poor" denotes the presence of less than 50% glass.

TABLE I

| 1 | 2 | 3 | 4 | 5 | 6 | 7 | 8 | 9 |
|---|---|---|---|---|---|---|---|---|

TABLE I-continued

| | | | | | | | | | |
|---|---|---|---|---|---|---|---|---|---|
| $Bi_2O_3$ | 95 | 88.5 | 81.5 | 74 | 74.5 | 70.5 | 66.5 | 65.5 | 56 |
| $Ga_2O_3$ | 2.5 | 2.5 | 2.5 | 2.5 | 5 | 8 | 25 | 5.5 | 9 |
| CdO | 2.5 | 9 | 16 | 23.5 | 20.5 | 21.5 | 8.5 | 29 | 35 |
| Quality | | | | | | | | | |
| 1 g | Poor | Poor | Fair | Poor | Good | Good | Good | Poor | Good |
| 50 g | — | — | — | Poor | Poor | — | Poor | — | Poor |

| | 10 | 11 | 12 | 13 | 14 | 15 | 16 | 17 | 18 |
|---|---|---|---|---|---|---|---|---|---|
| $Bi_2O_3$ | 46.5 | 90 | 86 | 86.5 | 87.5 | 90.5 | 88.5 | 85.5 | 82 |
| $Ga_2O_3$ | 15.1 | 6.5 | 5 | 7 | 9.5 | 9.5 | 11.5 | 14.5 | 18 |
| CdO | 38 | 3.5 | 9 | 6.5 | 3.5 | — | — | — | — |
| Quality | | | | | | | | | |
| 1 g | Poor | Fair | Fair | Good | Good | Good | Good | Good | Good |
| 50 g | — | — | — | — | Fair | — | Poor | Poor | Poor |

| | 19 | 20 | 21 | 22 | 23 | 24 | 25 | 26 | 27 |
|---|---|---|---|---|---|---|---|---|---|
| $Bi_2O_3$ | 78.5 | 75 | 83.5 | 84.5 | 83 | 82.5 | 79 | 81 | 78 |
| $Ga_2O_3$ | 21.5 | 25 | 13 | 11.5 | 7.5 | 4.5 | 7.5 | 14 | 18.5 |
| CdO | — | — | 3.5 | 5 | 9.5 | 5 | 13.5 | 5 | 3.5 |
| Quality | | | | | | | | | |
| 1 g | Good | Poor | Good | — | Good | Good | — | — | Good |
| 50 g | Poor | — | Poor | Good | Good | Fair | Good | Good | — |

| | 28 | 29 | 30 | 31 | 32 | 33 | 34 | 35 | 36 |
|---|---|---|---|---|---|---|---|---|---|
| $Bi_2O_3$ | 77.5 | 76.5 | 75 | 67 | 67.5 | 68.5 | 69 | 70.5 | 61.5 |
| $Ga_2O_3$ | 17 | 12.5 | 7.5 | 11 | 13.5 | 17.5 | 19.5 | 25.5 | 34 |
| CdO | 5.5 | 11 | 17.5 | 22 | 19 | 14 | 11.5 | 4 | 4.5 |
| Quality | | | | | | | | | |
| 1 g | — | Good | Good | — | Good | Poor | Good | Good | Poor |
| 50 g | Poor | Good | Good | Good | Good | Poor | Poor | — | — |

| | 37 | 38 | 39 | 40 | 41 | 42 | 43 | 44 | 45 |
|---|---|---|---|---|---|---|---|---|---|
| $Bi_2O_3$ | 59 | 57.5 | 57.5 | 52.5 | 47.5 | 42 | 48.5 | 49 | 34.5 |
| $Ga_2O_3$ | 20.5 | 14.5 | 11 | 18.5 | 22.5 | 30.5 | 29.5 | 37 | 31 |
| CdO | 20.5 | 28 | 31.5 | 29 | 30 | 27.5 | 22 | 14 | 34.5 |
| Quality | | | | | | | | | |
| 1 g | Good | Good | — | — | Good | Good | Good | Poor | Poor |
| 50 g | Fair | Good | Poor | Fair | Poor | Fair | — | — | — |

Figure 2:
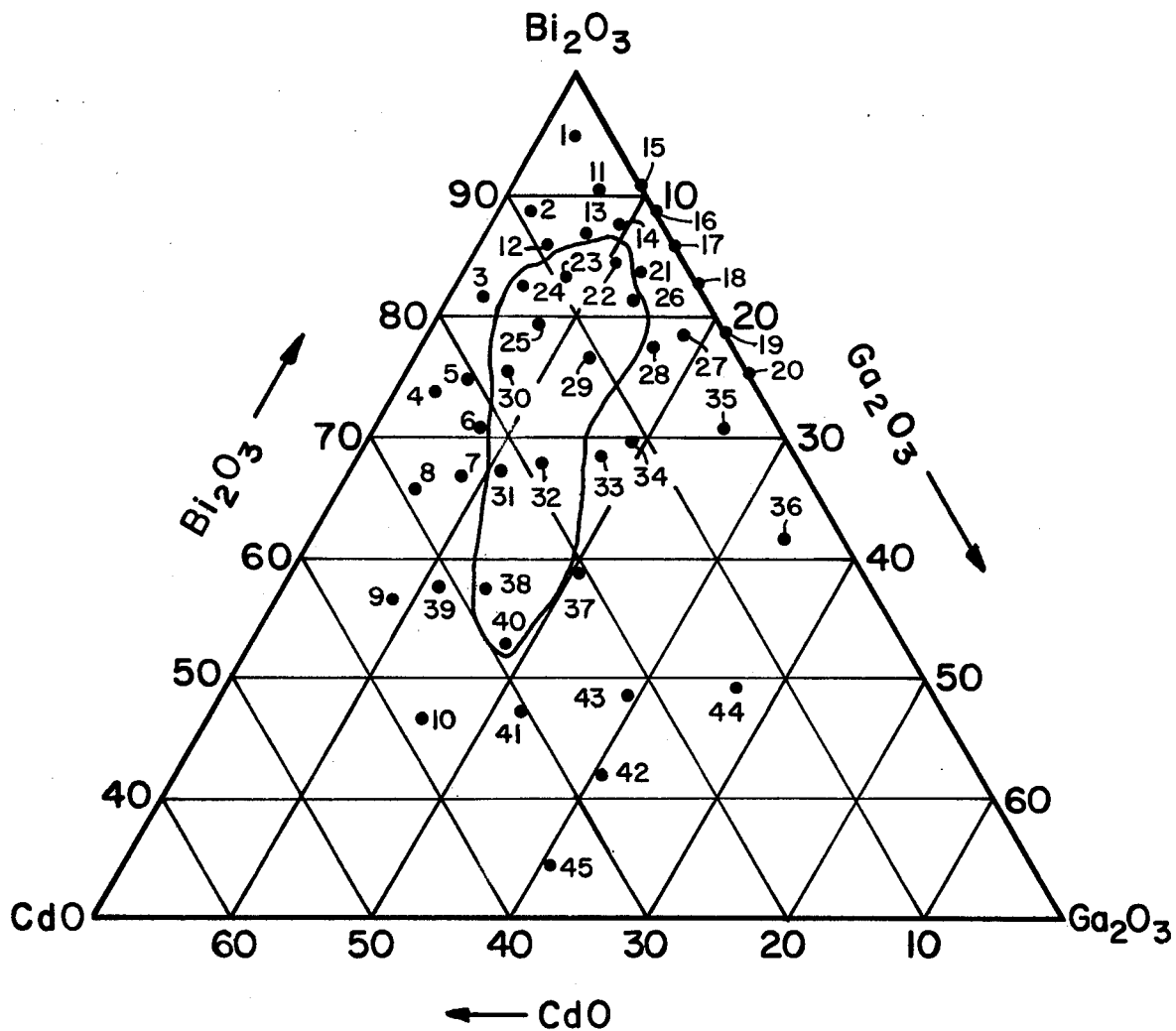
FIG. 2 is a ternary composition diagram of the $Bi_2O_3$—$Ga_2O_3$—CdO system illustrating the area of compositions forming good quality glass utilizing conventional glass melting and forming techniques.

Based upon the above Examples, the broadest ranges of operable glass compositions are generally encompassed within the curve set out in the ternary diagram comprising FIG. 1. The preferred regions of glass compositions are generally included within the curve delineated in FIG. 2.

Four glasses are reported in Table II having compositions within the area of good glass formation, expressed in terms of approximate weight percent on the oxide basis, which were selected for further study. Batches for 500 grams of glass were compounded, ballmilled to insure good mixing, and melted in platinum crucibles in the manner described above. The melts were cast into graphite molds, which had been preheated to 360° C., to yield glass slabs having the dimensions 7.5 cm×3 cm×1.3 cm, and the slabs annealed. Various physical properties were measured on the slabs utilizing methods conventional in the glass art. Those properties, which are also recorded in Table II, included coefficient of thermal expansion (Coef. Exp.) over the range 25°–300° C. expressed in terms of $\times 10^{-7}$/°C., annealing point (Ann. Pt.) in °C., strain point (Str. Pt.) in °C., refractive index ($n_D$) within ±0.05, log resistivity ($\rho$) at 250° C. and 350° C. in terms of ohm-cm, dielectric constant (D.C.) at 25° C. and 273° C. at 1 KHz, dissipation factor (D.F.) at 25° C. and 273° C. at 1 KHz, and Verdet constant (V.C.) in terms of min/Oe-cm.

TABLE II

| | 46 | 47 | 48 | 49 |
|---|---|---|---|---|
| $Bi_2O_3$ | 83.0 | 75.2 | 57.7 | 76.6 |
| $Ga_2O_3$ | 7.2 | 7.5 | 14.5 | 12.8 |
| CdO | 9.8 | 17.3 | 27.8 | 10.6 |
| Coef. Exp. | 111.5 | 109.3 | 97.2 | 100.6 |
| Ann. Pt. | 349 | — | — | 386 |
| Str. Pt. | 329 | — | — | 363 |
| $n_D$ | 2.43 | 2.27 | 2.30 | 2.45 |
| Log $\rho$ | | | | |
| 250° | 7.78 | — | — | 8.45 |
| 350° | 5.92 | — | — | 6.57 |
| D.C. | | | | |
| 25° | 34.88 | — | — | 30.08 |
| 273° | 60.74 | — | — | 44.06 |
| D.F. | | | | |
| 25° | 0.004 | — | — | 0.004 |
| 273° | 1.626 | — | — | 0.585 |
| V.C. | 0.19 | 0.15 | — | — |

Figure 3:
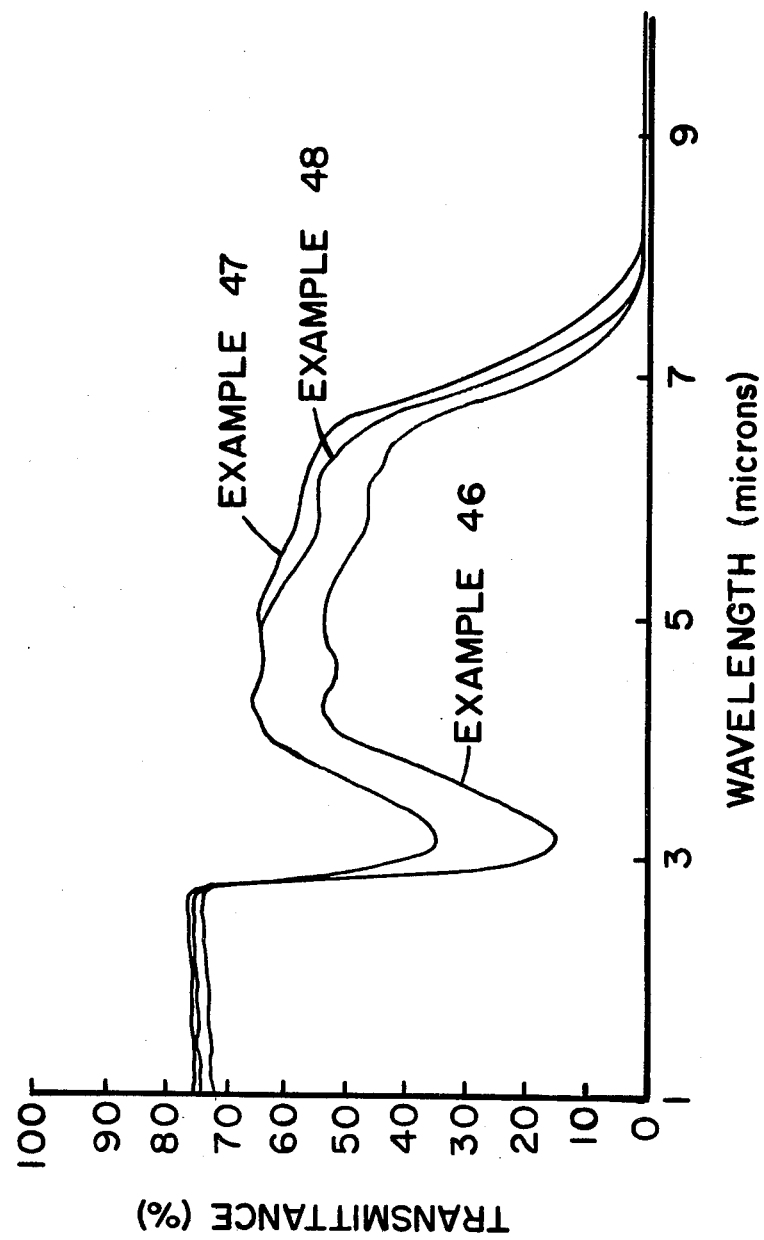
FIG. 3 records infrared transmittance curves demonstrated by several of the inventive glasses over the interval of about 2-8 microns.

Infrared transmission curves drawn by a Perkin-Elmer Model 221 infrared spectrophotometer from Examples 46, 47, and 48 comprise FIG. 3.

Example 46 constitutes the most preferred embodiment of the inventive compositions.

We claim:

1. An infrared transmitting glass consisting essentially, expressed in terms of weight percent on the oxide basis, of about

| $Bi_2O_3$ | 40–90 |
|---|---|
| $Ga_2O_3$ | 5–30 |
| CdO | 0–35 |

2. An infrared transmitting glass according to claim 1 consisting essentially of about

| | |
|---|---|
| Bi$_2$O$_3$ | 55–85 |
| Ga$_2$O$_3$ | 7–17 |
| CdO | 4–28 |

3. An infrared transmitting glass according to claim 1 also containing up to 30% total of the following compatible metal oxides in the indicated proportions selected from the group of:

| | | | |
|---|---|---|---|
| Cs$_2$O | 0–10 | GeO$_2$ | 0–3 |
| HgO | 0–25 | Sb$_2$O$_3$ | 0–4 |

4. An infrared transmitting glass according to claim 1 also containing up to 3% chlorine.

* * * * *